United States Patent
Nanda et al.

(10) Patent No.: US 10,997,129 B1
(45) Date of Patent: May 4, 2021

(54) DATA SET VIRTUAL NEIGHBORHOOD CHARACTERIZATION, PROVISIONING AND ACCESS

(71) Applicant: EMC Corporation, Hopkinton, MA (US)

(72) Inventors: Nihar Nanda, Acton, MA (US); David S. Reiner, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1089 days.

(21) Appl. No.: 14/487,520

(22) Filed: Sep. 16, 2014

(51) Int. Cl.
*G06F 16/21* (2019.01)
*G06F 16/22* (2019.01)
*G06F 16/11* (2019.01)

(52) U.S. Cl.
CPC ............ *G06F 16/21* (2019.01); *G06F 16/122* (2019.01); *G06F 16/22* (2019.01)

(58) Field of Classification Search
CPC ......... G06F 17/30289; G06F 17/30082; G06F 17/30212
USPC ........................................................ 707/694
See application file for complete search history.

(56) References Cited

U.S. PATENT DOCUMENTS

| | | | |
|---|---|---|---|
| 8,838,556 B1 | 9/2014 | Reiner et al. | |
| 2006/0235812 A1 | 10/2006 | Rifkin et al. | |
| 2007/0203872 A1* | 8/2007 | Flinn | G06N 5/048 706/62 |
| 2009/0018996 A1* | 1/2009 | Hunt | G06F 16/2264 |
| 2009/0083258 A1 | 3/2009 | Koren et al. | |
| 2012/0131507 A1* | 5/2012 | Sparandara | G16H 10/60 715/833 |
| 2013/0046710 A1* | 2/2013 | Kartoun | G06Q 40/06 705/36 R |

(Continued)

OTHER PUBLICATIONS

U.S. Appl. No. 13/538,219 filed in the name of D.S. Reiner et al., filed Jun. 29, 2012 and entitled "Dynamic Information Assembly for Designated Purpose Based on Suitability Reasoning Over Metadata."

(Continued)

*Primary Examiner* — Pierre M Vital
*Assistant Examiner* — Alicia M Antoine
(74) *Attorney, Agent, or Firm* — Ryan, Mason & Lewis, LLP (57) ABSTRACT

An apparatus comprises a processing platform configured for characterization, provisioning and access of data set virtual neighborhoods. The processing platform comprises a virtual neighborhood describer, a virtual neighborhood provisioner and a virtual neighborhood visitor. The virtual neighborhood describer is configured to generate characterizations of data set virtual neighborhoods responsive to one or more requirements, such as specified or derived requirements, or combinations thereof. The virtual neighborhood provisioner is configured to utilize the characterizations to generate provisioned data set virtual neighborhoods responsive to one or more corresponding provisioning requests. The virtual neighborhood visitor is configured to access at least one of: (a) one or more data set content indexes associated with at least one of the provisioned data set virtual neighborhoods, and (b) one or more data sets associated with at least one of the provisioned data set virtual neighborhoods, responsive to a given submitted access request.

23 Claims, 3 Drawing Sheets

(56) References Cited

U.S. PATENT DOCUMENTS

| | | | | |
|---|---|---|---|---|
| 2013/0091465 | A1* | 4/2013 | Kikin-Gil | G06F 3/0485 715/817 |
| 2013/0332484 | A1* | 12/2013 | Gajic | G06F 17/30286 707/770 |
| 2014/0022255 | A1* | 1/2014 | Barbouche | G06F 19/321 345/440 |
| 2014/0218383 | A1* | 8/2014 | Srivastava | G06T 11/206 345/589 |
| 2014/0245218 | A1* | 8/2014 | Conzola | G06F 17/30994 715/783 |
| 2014/0297642 | A1* | 10/2014 | Lum | G06F 19/36 707/737 |
| 2014/0304263 | A1* | 10/2014 | Vaitheeswaran | G06F 17/30598 707/737 |
| 2015/0039585 | A1* | 2/2015 | Fabijancic | G06F 17/30545 707/713 |
| 2015/0120731 | A1* | 4/2015 | Nemery | G06F 17/30598 707/737 |
| 2015/0269691 | A1* | 9/2015 | Bar Yacov | G06F 17/30728 705/311 |
| 2015/0293984 | A1* | 10/2015 | Zolotusky, Jr. | H04L 67/1097 707/634 |
| 2015/0302040 | A1* | 10/2015 | Amigud | G06F 17/30371 707/694 |
| 2015/0324453 | A1* | 11/2015 | Werner | G06F 17/30601 707/738 |
| 2015/0339369 | A1* | 11/2015 | Rais-Ghasem | G06F 17/30589 707/739 |

OTHER PUBLICATIONS

A. Rosenthal et al., "An Architecture for Query Optimization," Proceedings of the ACM SIGMOD International Conference on Management of Data, Jun. 1982, pp. 246-255.

* cited by examiner

DATA SET VIRTUAL NEIGHBORHOOD CHARACTERIZATION, PROVISIONING AND ACCESS

FIELD

The field relates generally to information processing systems, and more particularly to utilization of data sets in information processing systems.

BACKGROUND

In conventional information processing systems, data sets are often processed without adequate knowledge of interrelationships among those data sets. For example, such knowledge may be buried in particular processes or code, or may be otherwise difficult to obtain. As a result, obtaining such knowledge may require expertise on arcane details of processing operations and system design. Other types of information relating to data sets, such as data set lifecycles, are similarly opaque.

Accordingly, data set access in conventional systems is generally handled by complex extractions that do not support changing requirements of data consumers, or by providing access to heterogeneous data sources without the understanding of interrelationships that would make the data more relevant and useful.

SUMMARY

Illustrative embodiments of the present invention are configured to utilize what are referred to herein as "virtual neighborhoods" each relating to one or more data sets. For example, illustrative embodiments provide techniques for data set virtual neighborhood characterization, provisioning and access.

In one embodiment, an apparatus comprises a processing platform configured for characterization, provisioning and access of data set virtual neighborhoods. The processing platform comprises a virtual neighborhood describer, a virtual neighborhood provisioner and a virtual neighborhood visitor. The virtual neighborhood describer is configured to generate characterizations of data set virtual neighborhoods responsive to one or more requirements, such as specified or derived requirements, or combinations thereof. The virtual neighborhood provisioner is configured to utilize the characterizations to generate provisioned data set virtual neighborhoods responsive to one or more corresponding provisioning requests. The virtual neighborhood visitor is configured to access at least one of: (a) one or more data set content indexes associated with at least one of the provisioned data set virtual neighborhoods, and (b) one or more data sets associated with at least one of the provisioned data set virtual neighborhoods, responsive to a given submitted access request.

The illustrative embodiments provide a number of significant advantages relative to the conventional arrangements described previously. For example, through the use of data set virtual neighborhoods and associated characterization, provisioning and access functionality, these embodiments can better meet changing requirements of data consumers, providing data consumers with more relevant and useful data from multiple heterogeneous data sources, while also avoiding the substantial difficulties associated with obtaining data set interrelationship knowledge in conventional systems.

Embodiments of the invention include, without limitation, apparatus, systems, methods, and articles of manufacture comprising processor-readable storage media.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
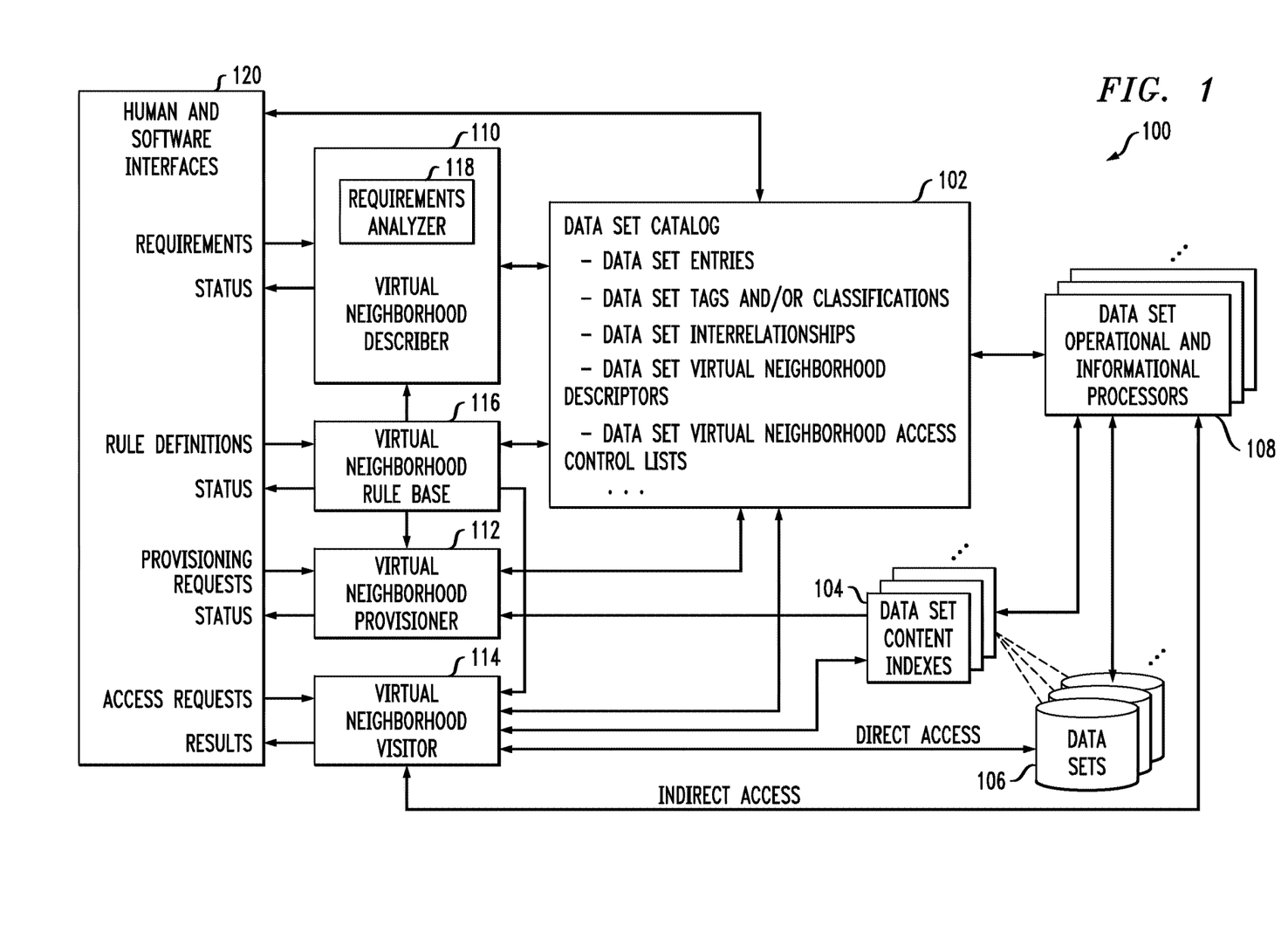
FIG. 1 is a block diagram of an information processing system configured for data set virtual neighborhood characterization, provisioning and access in an illustrative embodiment of the invention.

FIG. 1 shows an information processing system 100 configured in accordance with an illustrative embodiment of the present invention. The information processing system 100 is assumed to be built on at least one processing platform and provides functionality for data set virtual neighborhood characterization, provisioning and access. The information processing system 100 comprises a data set catalog 102 and associated data set content indexes 104. The data set catalog 102 and data set content indexes 104 are based at least in part on data sets stored in storage devices 106. The storage devices 106 illustratively comprise storage disks, storage arrays, electronic memories or other types of memory, in any combination.

A "data set" as the term is broadly used herein may be viewed, for example, as an abstraction of one or more data items, such as a table, document, file, query result, set of key-value pairs, index, storage block contents, in-memory caches or other data item or combinations thereof, where the given data set is characterized by properties as well as relationships to other data sets. These properties and relationships are captured by metadata that is associated with the data set in the system 100. For example, metadata can be used to describe data set characteristics such as ownership, type, content, schema, classification, matchable patterns, text analytics characterizations, security classifications, provenance, usability, quality, ad hoc user tags, and many others.

Additional details regarding exemplary data sets and metadata characterizing those data sets, as well as techniques for reasoning over such metadata, can be found in U.S. patent application Ser. No. 13/336,613, filed Dec. 23, 2011 and entitled "Managing Data Sets by Reasoning over Captured Metadata," and U.S. patent application Ser. No. 13/538,219, filed Jun. 29, 2012 and entitled "Dynamic Information Assembly for Designated Purpose based on Suitability Reasoning over Metadata," both of which are commonly assigned herewith and incorporated by reference herein.

The information processing system 100 further comprises data set operational and informational processors 108 coupled to the data set catalog 102, the data set content indexes 104 and the storage devices 106. The data set processors 108 or a subset thereof are configured to process data sets from the storage devices 106 to generate at least a portion of the data set content indexes 104 for use by other components of the system 100, as will be described in more detail below. In addition, the data set processors 108 or a subset thereof can be configured to generate other types of information, such as, for example, data set metadata for use in the data set catalog 102.

The data set processors 108 illustratively comprise one or more operational processors and one or more informational processors, each of which may include at least one of a data set reader, a data set writer, a data set classifier, a data set crawler and a data set indexer. More particular examples of operational processors include processors configured to perform Extract, Transform and Load (ETL) processes, Back-Up and Recovery (BUR) processes or Back-Up, Recovery and Archive (BURA) processes. Exemplary informational processors, in addition to the above-noted crawlers, include spiders and bots.

Other components of the information processing system 100 include a virtual neighborhood describer 110, a virtual neighborhood provisioner 112 and a virtual neighborhood visitor 114.

The virtual neighborhood describer 110 is configured to generate characterizations of data set virtual neighborhoods responsive to one or more requirements, which illustratively comprise specified or derived requirements, or various combinations thereof.

A given data set virtual neighborhood in the present embodiment illustratively comprises a virtual grouping of a plurality of interrelated data sets determined at least in part based on one or more of metadata describing the data sets, content indexes related to the data sets, and content of the data sets. Other types and configurations of data set virtual neighborhoods can be used in other embodiments.

It should be noted that a data set virtual neighborhood as the term is used herein may exhibit delayed binding to one or more of its constituent data sets. This may arise, for example, in situations in which the exact data sets are unknown at the time of creation of the virtual neighborhood. As a more particular example, a data set virtual neighborhood may be defined based at least in part on a sliding time window, such that the data sets corresponding to the previously-created data set virtual neighborhood are not fully known until after a start time of a current instance of the time window.

The virtual neighborhood provisioner 112 is configured to utilize the characterizations to generate provisioned data set virtual neighborhoods responsive to one or more corresponding provisioning requests. It should be noted that terms such as "provisioning" as used herein in the context of a data set virtual neighborhood refer generally to making the data set virtual neighborhood available for access. In generating the provisioned data set virtual neighborhoods, the virtual neighborhood provisioner 112 ensures that the provisioned data set virtual neighborhoods satisfy access control requirements and/or compliance requirements associated with the one or more provisioning requests. Access control and compliance functionality may be performed at least in part in cooperation with other system components, such as the virtual neighborhood visitor 114.

The timing of a provisioning request may influence the particular data sets that are associated with a provisioned data set virtual neighborhood. For example, the choice of a particular data set for use in a provisioned data set virtual neighborhood may be based on factors such as load balancing or availability.

The virtual neighborhood visitor 114 is configured to access at least one of: (a) one or more data set content indexes associated with at least one of the provisioned data set virtual neighborhoods, and (b) one or more data sets associated with at least one of the provisioned data set virtual neighborhoods, responsive to a given submitted access request. Such access requests may comprise, for example, search requests, query requests, view requests or other types of requests involving access to data set content indexes and/or data sets.

As illustrated in the figure, the virtual neighborhood visitor 114 can access the data set catalog 102 and the data set content indexes 104. In addition, the virtual neighborhood visitor 114 has direct access to the data sets stored in storage devices 106.

The virtual neighborhood visitor 114 also has indirect access to the data sets via the data set operational and informational processors 108. For example, the virtual neighborhood visitor 114 may invoke one or more of the informational processors for informational purposes.

Various types of search, query, view or other access functionality relating to provisioned data set virtual neighborhoods can be implemented by the virtual neighborhood visitor 114.

By way of example, the virtual neighborhood visitor 114 in accessing data set content indexes or data sets can integrate, materialize or move at least a subset of the data sets.

As another example, the virtual neighborhood visitor 114 in accessing data set content indexes or data sets can support federated query processing through external table mechanisms associated with one or more data management systems. Additionally or alternatively, federated query processing can be supported through data virtualization software.

The information processing system 100 additionally includes a virtual neighborhood rule base 116 adapted for communication with the data set catalog 102, the virtual neighborhood describer 110, the virtual neighborhood provisioner 112 and the virtual neighborhood visitor 114. Rules stored in the virtual neighborhood rule base 116 are utilized, for example, by the virtual neighborhood describer 110 in generating the characterizations of the data set virtual neighborhoods, by the virtual neighborhood provisioner 112 in generating the provisioned data set virtual neighborhoods, and by the virtual neighborhood visitor 114 in accessing at least one of the one or more data set content indexes and the one or more data sets. In other embodiments, separate portions or instances of the virtual neighborhood rule base 116 can be distributed over one or more of the system components 102, 110, 112 and 114 rather than being implemented in a centralized manner as in the present embodiment.

The virtual neighborhood describer 110 in the present embodiment comprises a requirements analyzer 118. The requirement analyzer 118 receives one or more requirements that are provided to the virtual neighborhood describer 110 from a set of human and software interfaces 120. The requirements analyzer 118 processes the one or more requirements and provides information derived therefrom to other portions of the virtual neighborhood describer 110 for use in characterizing the data set virtual neighborhoods.

Although shown as being implemented internally to the virtual neighborhood describer 110, the requirements analyzer 118 in other embodiments can be implemented in another system component, as a stand-alone component, or otherwise externally to but nonetheless associated with the virtual neighborhood describer 110.

The virtual neighborhood describer 110 in the present embodiment is configured to generate data set virtual neighborhood descriptors for respective ones of the data set virtual neighborhoods. This may involve, for example, mapping particular requirements or information derived therefrom to one or more of the data set virtual neighborhoods.

The data set virtual neighborhood descriptors are included in the data set catalog 102, which is accessible to the virtual neighborhood describer 110, the virtual neighborhood provisioner 112 and the virtual neighborhood visitor 114, as well as to other system components including data set operational and informational processors 108, virtual neighborhood rule base 116 and human and software interfaces 120.

Also included in the data set catalog 102 are data set entries, data set tags and/or classifications, data set interrelationships and data set access control lists. This particular arrangement of data set catalog elements is exemplary only, and additional or alternative catalog elements can be used in other embodiments.

The human and software interfaces 120 are illustratively configured to provide requirements to the virtual neighborhood describer 110 and to receive status therefrom, to provide provisioning requests to the virtual neighborhood provisioner 112 and to receive status therefrom, to provide access requests to the virtual neighborhood visitor 114 and to receive results therefrom, and to provide rule definitions to the virtual neighborhood rule base 116 and to receive status therefrom. The interfaces 120 are also able to communicate directly with the data set catalog 102. Although shown as a combined set of interfaces in the figure, the interfaces 120 may be implemented as separate and independent interfaces for each of the system components 102, 110, 112, 114 and 116. Alternatively, a single human and/or software interface providing access to all of these components may be utilized. The software interfaces are examples of interfaces for what are more generally referred to herein as "automated" data consumers.

As indicated previously, data sets in some embodiments are abstractions over different ways of grouping and structuring data, and a given such data set may illustratively comprise any assemblage of data to be tracked and used. Data sets may be generated by business processes (e.g., customer data), by machines (e.g., computer logs, sensor data), by humans (e.g., social data, texts, photos, videos) and in numerous other ways. Data sets participate in lifecycles in which they are, for example, created, copied, transformed, anonymized, moved, synchronized, joined, archived, and even destroyed.

In conventional systems of the type described elsewhere herein, there is often a largely unknown or at least unrecorded network of relationships among heterogeneous, distributed data sets over time.

The use of data set virtual neighborhoods in the present embodiment overcomes these and other drawbacks of conventional systems. For example, the data set virtual neighborhoods and associated virtual neighborhood characterization, provisioning and access functionality allow data consumers, whether human or automated, to find interesting, relevant, or required data sets when needed, to provision them rapidly into an analytic or operational environment, and to search and analyze their content in real-time or near real-time. These and other exemplary system features are achieved in a data set virtual neighborhood framework that accommodates broad ranges of data set heterogeneity, semantic content, latency, complex interrelationships and lifecycles, distribution and federation, and formality.

The present embodiment brings together data set metadata and interrelationships with data set content indexes to solve the difficulties of conventional systems. Driven by metadata, interrelationships, and indexes, it locates, catalogs, and offers up interconnected data sets across multiple, heterogeneous sources in order to provision relevant data, meeting specified and/or derived requirements, to applications, analytic platforms, data lakes, data warehouses, clouds, and other data consumers. Such interconnected data sets are examples of what are more generally referred to herein as data set virtual neighborhoods.

Human or automated data consumers can search, query, view, navigate or otherwise access the system 100 via its constituent components in order to identify data set virtual neighborhoods that meet their particular requirements (e.g., for predictive model construction, forensic analysis, business intelligence, or contextualization of potential actions such as customer marketing campaigns).

By way of example, in some implementations of the information processing system 100, the virtual neighborhood describer 110 intelligently maps requirements to data set virtual neighborhoods, the virtual neighborhood provisioner 112 rapidly provisions data set virtual neighborhoods to data consumers, and the virtual neighborhood visitor 114 flexibly searches or otherwise accesses provisioned data set virtual neighborhoods.

It is to be appreciated that the particular arrangement of system components illustrated in FIG. 1 is exemplary only, and that numerous other arrangements of components may be used in other embodiments. For example, in other embodiments, functionality described herein as being associated with one or more of the virtual neighborhood describer 110, virtual neighborhood provisioner 112, and virtual neighborhood visitor 114 may be implemented at least in part using additional or alternative components of the system 100.

The virtual neighborhood describer 110, virtual neighborhood provisioner 112, virtual neighborhood visitor 114, and other components of system 100, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing electronic memory. The term "article of manufacture" as used herein should be understood to exclude transitory, propagating signals.

The one or more processing devices implementing virtual neighborhood describer 110, virtual neighborhood provisioner 112, virtual neighborhood visitor 114, and possibly other components of system 100, may each further include a network interface that allows such components to communicate with one another over one or more networks. For example, a given such network interface illustratively comprises network interface circuitry that allows at least one of virtual neighborhood describer 110, virtual neighborhood provisioner 112, and virtual neighborhood visitor 114 to communicate over a network with other components of the system 100 such as data set catalog 102, virtual neighborhood rule base 116 and human and software interfaces 120. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the virtual neighborhood describer 110, virtual neighborhood provisioner 112, and virtual neighborhood visitor 114, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 3 and 4.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be further described with reference to the flow diagram of FIG. 2, which illustrates an exemplary process carried out by the system 100 in one embodiment. The process as shown includes steps 200, 202, 204A and 204B. Steps 200 and 202 are assumed to be performed by the virtual neighborhood describer 110 and the virtual neighborhood provisioner 112, respectively. Steps 204A and 204B are assumed to be performed by the virtual neighborhood visitor 114.

Figure 2:
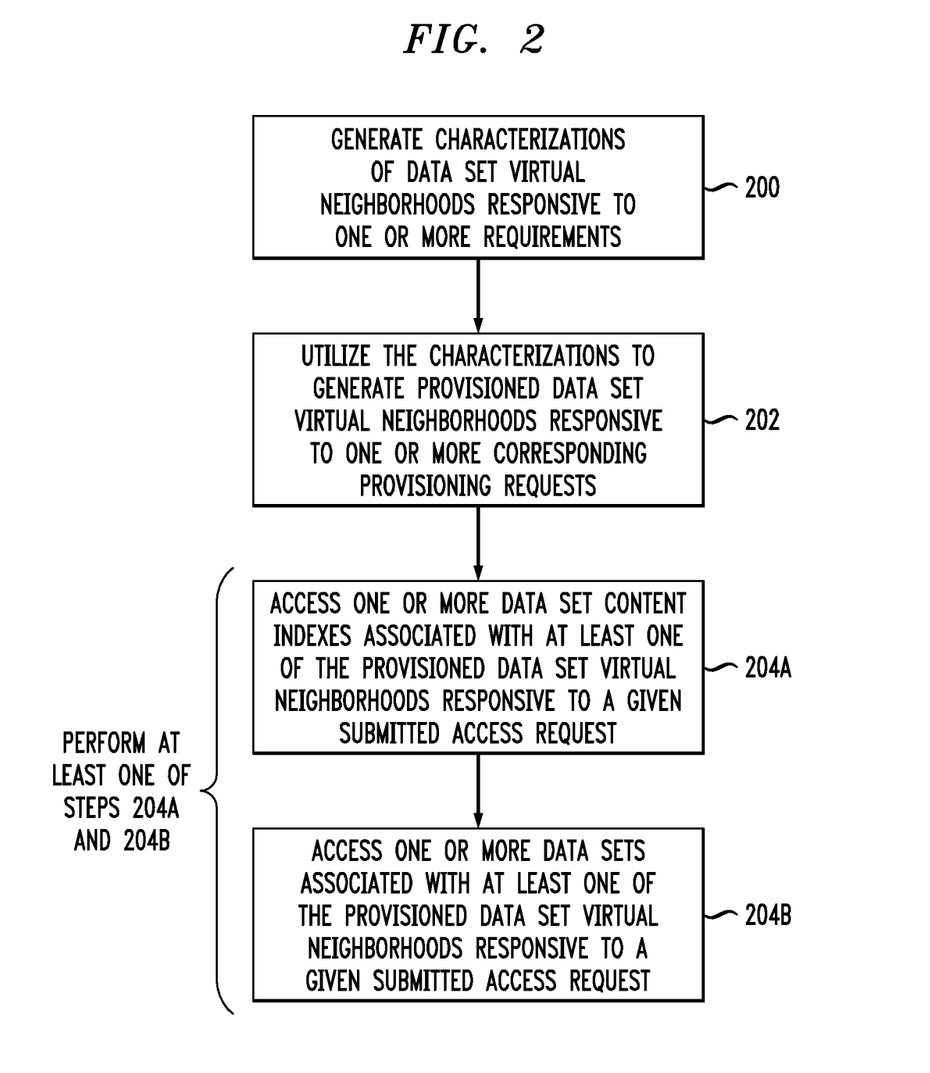
FIG. 2 is a flow diagram of an exemplary process implemented in the information processing system of FIG. 1.

In a given implementation of the FIG. 2 process, one or both of steps 204A and 204B may be performed by the virtual neighborhood visitor 114. Accordingly, in some implementations, only one of steps 204A and 204B is performed.

It should be noted that at least portions of one or more of the process steps 200, 202, 204A and 204B may be performed by other system components. Moreover, functionality for data set virtual neighborhood characterization, provisioning and access as disclosed herein should not be viewed as limited in any way to this arrangement of process steps.

In step 200, characterizations of data set virtual neighborhoods are generated responsive to one or more requirements, such as specified or derived requirements, or combinations thereof.

As described previously, the data set virtual neighborhoods illustratively comprise respective virtual groupings of interrelated data sets determined at least in part based on one or more of metadata describing the data sets, content indexes related to the data sets, and content of the data sets.

The characterizations generated in step 200 illustratively comprise data set virtual neighborhood descriptors generated for respective ones of the data set virtual neighborhoods. These data set virtual neighborhood descriptors are included in the data set catalog 102.

Some implementations of step 200 involve mapping particular requirements or information derived therefrom to one or more of the data set virtual neighborhoods. For example, mapping data requirements to data set virtual neighborhoods may be done through search and query functionality enabling human and automated data consumers to quickly locate relevant data, meeting specified and/or derived requirements, in the analysis process.

Specific search capabilities may include one or more of the following:

1. Performing contextual, pattern-based search of multiple data types across data sets and across previously-defined data set virtual neighborhoods.

2. Presenting search results with meaningful semantic qualifiers, such as data source location, business context, quality indicators, completeness measures, latency measures, freshness measures, security identifiers, and data formats.

3. Relating search keywords to business context of the users such as a zip code search that looks for related context synonyms such as postal code or postal PIN to bring back data sets containing these data fields.

In step 202, the characterizations are utilized to generate provisioned data set virtual neighborhoods responsive to one or more corresponding provisioning requests.

Rapidly provisioning data set virtual neighborhoods to data consumers may involve one or more of the following:

1. Capturing data set virtual neighborhood descriptors.

2. Managing approval workflow for data set virtual neighborhood provisioning.

3. Setting up, enabling, and verifying access to data sets and data set virtual neighborhoods within the context of the data consumer that requests the provisioning.

In step 204A, one or more data sets associated with at least one of the provisioned data set virtual neighborhoods are accessed responsive to a given submitted access request.

In step 204B, one or more data set content indexes associated with at least one of the provisioned data set virtual neighborhoods are accessed responsive to a given submitted access request.

The given submitted access request referred to in the context of steps 204A and 204B may be the same access request for each step, or a different access request for each step. As mentioned previously, in some implementations of the process, only one of steps 204A and 204B is performed, while in other implementations, both of the steps 204A and 204B are performed. In implementations of the latter type, step 204A may be performed prior to step 204B, or vice-versa, or the steps may be performed concurrently with one another.

Flexibly searching and accessing provisioned data set virtual neighborhoods depends on choice of access mechanisms, including, for example:

1. Data set indexing to support content and metadata search.

2. Periodic data set integration, materialization, or movement.

3. Federated query processing through, for example, external table mechanisms associated with one or more data management systems. Additionally or alternatively, data virtualization software can be used for this purpose.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing data set virtual neighborhood characterization, provisioning and access. For example, the ordering of the process steps may be varied in other embodiments, or certain steps may be performed concurrently with one another rather than serially.

It is to be appreciated that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

A number of additional illustrative embodiments of exemplary systems and processes implementing characterization, provisioning and access of data set virtual neighborhoods as disclosed herein will now be described.

In one embodiment, an externally hosted salesforce management system feeds data sets (e.g., information about customers, contacts, contracts, accounts, products, and locations) in streams to a data set processor to build data set indexes. Metadata (e.g., data structure and control parameters related to the data streams) flows to the data set catalog to be included in data set entries and then into virtual neighborhood classifications and descriptions. A data governance team specifies additional classification metadata about these data sets with respect to data security and access. Analytic users interested in the data choose relevant data sets, are informed about other associated data sets based on their requirements and profile, and then ask for access. The requested access approvals flow through a workflow system to receive required levels of authorization. The provisioning process automatically attaches a view of provisioned data set virtual neighborhoods to each user's analytic sandbox for subsequent analysis.

In another embodiment, customer support contact transcripts from multiple sources including emails, online chats and voice recordings are collected, passed to one or more data set processors for indexing and for mapping to key entities such as customer IDs and products. The data set catalog gathers customer support call references by products and links the references to the sentiments expressed about those products by customers in those calls (e.g., through sentiment analysis done by another data set processor), enabling data scientists to analyze the calls and to generate the root cause of sentiments both positive and negative. In this embodiment, data set virtual neighborhood descriptors allow the relevant data sets to be gathered quickly.

In a further embodiment, data from expense management systems is indexed and linked through data set processors based on employee IDs and financial types before being stored. Based on their jurisdiction, auditors and controllers are provisioned with data set virtual neighborhood views in their analysis tools of choice to perform analyses. The data set virtual neighborhoods are created by applying the rule base to the metadata tags associated with the indexed expense data sets.

In these and other embodiments, data set virtual neighborhoods can be utilized to facilitate implementation of features such as Business Analytics as a Service (BAaaS).

Of course, these embodiments are only examples, and numerous other embodiments utilizing data set virtual neighborhoods will be apparent to those skilled in the art given the teachings herein.

The illustrative embodiments provide a number of significant advantages relative to the conventional arrangements previously described. For example, through the use of data set virtual neighborhoods and associated characterization, provisioning and access functionality, these embodiments can better meet changing requirements of data consumers, providing data consumers with more relevant and useful data from multiple heterogeneous data sources, while also avoiding the substantial difficulties associated with obtaining data set interrelationship knowledge in conventional systems.

It is apparent that some embodiments of the invention implement data set virtual neighborhoods as a useful abstraction to meet the changing requirements of data consumers. For example, some embodiments leverage both data set metadata and data set content to target data set virtual neighborhoods using similarity measures, interrelationships, fuzzy searches, and faceted navigation.

These embodiments also combine flexible provisioning with indexing for powerful searches, queries and analyses across data set virtual neighborhoods.

In addition, through an understanding of data set lifecycles and interrelationships, support is provided for the full data latency spectrum from real-time to recent to historical data.

Furthermore, these embodiments can be configured to support both "schema on read" and multi-schema approaches, and therefore do not depend on the enforcement of formal "schema on write" approaches.

A framework for data set virtual neighborhood characterization, provisioning and access can be built efficiently on top of existing data gathering functionality and tools, as well as existing analytics and visualization approaches. Such a framework can provide more powerful analytics than conventional systems.

It is to be appreciated that the foregoing advantages are illustrative of advantages provided in certain embodiments, and need not be present in other embodiments.

It was noted above that portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 3:
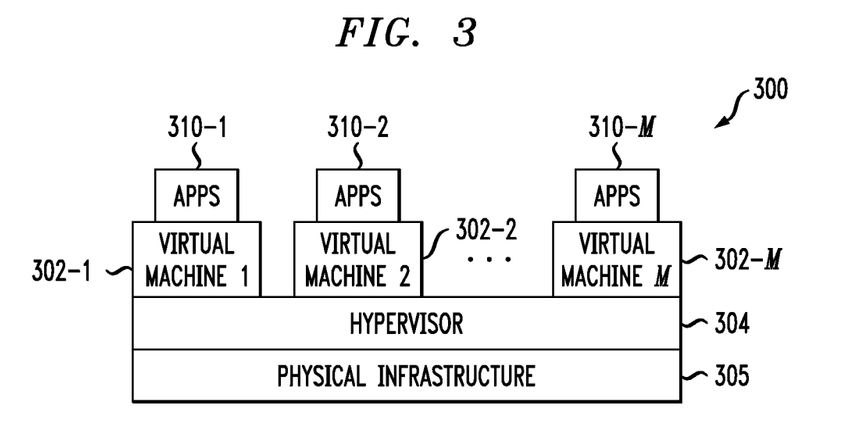
FIGS. 3 and 4 show examples of processing platforms that may be utilized to implement at least a portion of the information processing system of FIG. 1.

As shown in FIG. 3, portions of the information processing system 100 may comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 may of course include multiple hypervisors each providing a set of virtual machines running at least one underlying physical machine. For example, different sets of virtual machines provided by respective ones of multiple hypervisors may be utilized in configuring multiple instances of virtual neighborhood describer 110, virtual neighborhood provisioner 112 and virtual neighborhood visitor 114, or other components of the system 100.

An example of a commercially available hypervisor platform that may be used to implement hypervisor 304 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
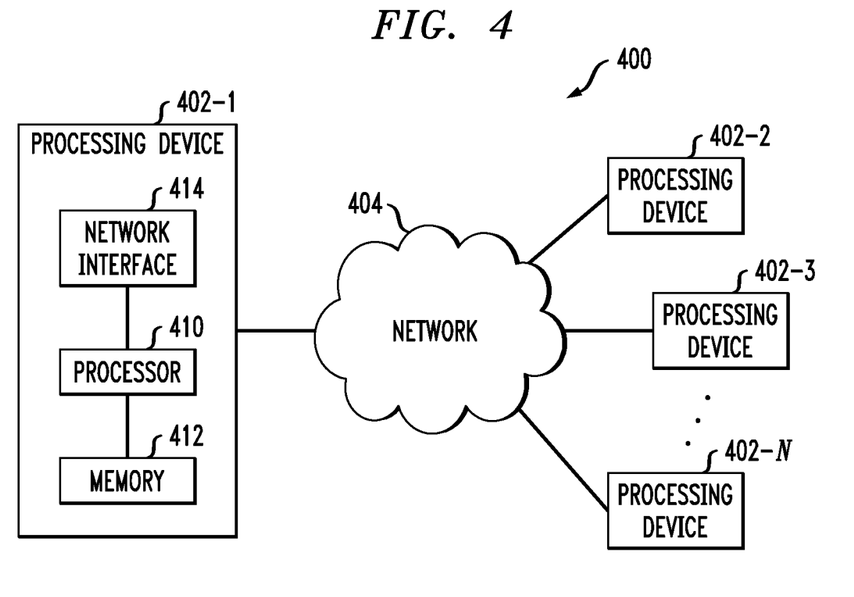

The processing platform 400 in this embodiment comprises a portion of system 100 and includes a plurality of processing devices, denoted 402-1, 402-2, 402-3, ... 402-N, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an ASIC, an FPGA, or other type of processing circuitry, as well as portions or combinations of such circuitry elements.

The memory 412 may comprise RAM, ROM or other types of memory, in any combination. As mentioned previously, the memory 412 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
   a processing platform configured for characterization, provisioning and access of data set virtual neighborhoods;
   wherein the processing platform comprises:
   a virtual neighborhood describer configured to generate characterizations of data set virtual neighborhoods responsive to one or more requirements;
   a requirements analyzer associated with the virtual neighborhood describer and adapted to receive the one or more requirements via an interface;
   wherein the requirements analyzer processes the one or more requirements and provides information derived therefrom to the virtual neighborhood describer for use in characterizing the data set virtual neighborhoods;
   wherein the virtual neighborhood describer in generating the characterizations is further configured to map the one or more requirements to one or more of the data set virtual neighborhoods;
   a virtual neighborhood provisioner configured to utilize the characterizations to generate provisioned data set virtual neighborhoods responsive to one or more corresponding provisioning requests; and
   a virtual neighborhood visitor configured to access at least one of:
      (a) one or more data set content indexes associated with at least one of the provisioned data set virtual neighborhoods; and
      (b) one or more data sets associated with at least one of the provisioned data set virtual neighborhoods,
   responsive to a given submitted access request;
   wherein a given one of the data set virtual neighborhoods for which a characterization is generated comprises a virtual grouping of a plurality of data sets from multiple heterogeneous data sources previously determined to be interrelated based at least in part on metadata describing the data sets, content indexes related to the data sets and content of the data sets;

wherein the virtual neighborhood provisioner is configured to generate a given provisioned data set virtual neighborhood for the given data set virtual neighborhood by setting up, enabling and verifying access to the interrelated data sets of the given data set virtual neighborhood within a context of a data consumer associated with a corresponding provisioning request and wherein the processing platform further comprises one or more processing devices each comprising a processor coupled to a memory.

2. The apparatus of claim 1 wherein the processing platform further comprises:

a virtual neighborhood rule base adapted for communication with at least a subset of the virtual neighborhood describer, the virtual neighborhood provisioner and the virtual neighborhood visitor;

wherein rules stored in the virtual neighborhood rule base are utilized in at least one of the following:

by the virtual neighborhood describer in generating the characterizations of the data set virtual neighborhoods;

by the virtual neighborhood provisioner in generating the provisioned data set virtual neighborhoods; and by the virtual neighborhood visitor in accessing at least one of the one or more data set content indexes and the one or more data sets.

3. The apparatus of claim 1 wherein the processing platform further comprises:

a plurality of data set storage devices; and a plurality of data set processors coupled to the data set storage devices;

wherein the data set processors are configured to process data sets from the data set storage devices to generate at least a portion of the data set content indexes for use by at least one of the virtual neighborhood describer, the virtual neighborhood provisioner and the virtual neighborhood visitor.

4. The apparatus of claim 3 wherein the plurality of data set processors comprise one or more operational processors and one or more informational processors, including at least one of a data set reader, a data set writer, a data set classifier, a data set crawler and a data set indexer.

5. The apparatus of claim 1 wherein the virtual neighborhood describer is configured to generate data set virtual neighborhood descriptors for respective ones of the data set virtual neighborhoods.

6. The apparatus of claim 5 wherein the data set virtual neighborhood descriptors are part of a data set catalog accessible to at least a subset of the virtual neighborhood describer, the virtual neighborhood provisioner and the virtual neighborhood visitor.

7. The apparatus of claim 6 wherein the data set catalog further comprises one or more of data set entries, data set tags, data set classifications, data set interrelationships and data set access control lists.

8. The apparatus of claim 1 wherein the virtual neighborhood provisioner in generating the provisioned data set virtual neighborhoods is further configured to ensure that the provisioned data set virtual neighborhoods satisfy at least one of access control requirements and compliance requirements associated with said one or more provisioning requests.

9. The apparatus of claim 1 wherein the virtual neighborhood visitor in accessing at least one of said one or more data set content indexes and said one or more data sets associated with at least one of the provisioned data set virtual neighborhoods is further configured to integrate, materialize or move at least a subset of said one or more data sets.

10. The apparatus of claim 1 wherein the virtual neighborhood visitor in accessing at least one of said one or more data set content indexes and said one or more data sets associated with at least one of the provisioned data set virtual neighborhoods is further configured to support federated query processing through at least one of: external table mechanisms associated with one or more data management systems, and data virtualization software.

11. The apparatus of claim 1 wherein the given submitted access request comprises one or more of a search request, a query request and a view request.

12. An information processing system comprising the apparatus of claim 1.

13. A method comprising:

generating characterizations of data set virtual neighborhoods responsive to one or more requirements;

wherein generating characterizations of data set virtual neighborhoods responsive to one or more requirements comprises:

receiving the one or more requirements via an interface;

processing the one or more requirements to provide information derived therefrom for use in characterizing the data set virtual neighborhoods; and mapping the one or more requirements to one or more of the data set virtual neighborhoods;

utilizing the characterizations to generate provisioned data set virtual neighborhoods responsive to one or more corresponding provisioning requests; and accessing at least one of:

(a) one or more data set content indexes associated with at least one of the provisioned data set virtual neighborhoods; and (b) one or more data sets associated with at least one of the provisioned data set virtual neighborhoods, responsive to a given submitted access request;

wherein a given one of the data set virtual neighborhoods for which a characterization is generated comprises a virtual grouping of a plurality of data sets from multiple heterogeneous data sources previously determined to be interrelated based at least in part on metadata describing the data sets, content indexes related to the data sets and content of the data sets;

wherein generating a given provisioned data set virtual neighborhood for the given data set virtual neighborhood comprises setting up, enabling and verifying access to the interrelated data sets of the given data set virtual neighborhood within a context of a data consumer associated with a corresponding provisioning request; and wherein the generating, utilizing and accessing are performed by a processing platform comprising one or more processing devices.

14. The method of claim 13 wherein generating characterizations of data set virtual neighborhoods comprises generating data set virtual neighborhood descriptors for respective ones of the data set virtual neighborhoods.

15. The method of claim 14 further comprising storing the data set virtual neighborhood descriptors in a data set catalog.

16. An article of manufacture comprising a processor-readable storage medium having one or more software programs embodied therein, wherein the one or more software programs when executed by at least one processing device of a processing platform cause the processing device:
to generate characterizations of data set virtual neighborhoods responsive to one or more requirements;
wherein generating characterizations of data set virtual neighborhoods responsive to one or more requirements comprises:
receiving the one or more requirements via an interface;
processing the one or more requirements to provide information derived therefrom for use in characterizing the data set virtual neighborhoods; and
mapping the one or more requirements to one or more of the data set virtual neighborhoods;
to utilize the characterizations to generate provisioned data set virtual neighborhoods responsive to one or more corresponding provisioning requests; and
to access at least one of:
(a) one or more data set content indexes associated with at least one of the provisioned data set virtual neighborhoods; and
(b) one or more data sets associated with at least one of the provisioned data set virtual neighborhoods,
responsive to a given submitted access request;
wherein a given one of the data set virtual neighborhoods for which a characterization is generated comprises a virtual grouping of a plurality of data sets from multiple heterogeneous data sources previously determined to be interrelated based at least in part on metadata describing the data sets, content indexes related to the data sets and content of the data sets; and
wherein generating a given provisioned data set virtual neighborhood for the given data set virtual neighborhood comprises setting up, enabling and verifying access to the interrelated data sets of the given data set virtual neighborhood within a context of a data consumer associated with a corresponding provisioning request.

17. The article of manufacture of claim 16 wherein generating characterizations of data set virtual neighborhoods comprises generating data set virtual neighborhood descriptors for respective ones of the data set virtual neighborhoods.

18. The article of manufacture of claim 17 wherein the data set virtual neighborhood descriptors are stored in a data set catalog.

19. The apparatus of claim 1 wherein the virtual grouping of the plurality of data sets of the given data set virtual neighborhood is associated with a sliding time window and further comprises at least one additional data set that is not fully known until after a start time of a current instance of the sliding time window, the given data set virtual neighborhood thereby exhibiting delayed binding to the at least one additional data set.

20. The apparatus of claim 1 wherein the virtual neighborhood visitor is configured:
to authorize access by the data consumer to each of the interrelated data sets of the given data set virtual neighborhood; and
responsive to authorizing the data consumer, to attach a view of the one or more data set context indexes and the one or more data sets associated with the given provisioned data set virtual neighborhood to an analytic sandbox associated with the data consumer.

21. The apparatus of claim 1 wherein at least one of data sets in the generated given provisioned data set virtual neighborhood is selected from the plurality of data sets in the virtual grouping of the given data set virtual neighborhood based on an identity of the data consumer associated with the corresponding provisioning request.

22. The method of claim 13, further comprising
authorizing access by the data consumer to each of the interrelated data sets of the given data set virtual neighborhood; and
responsive to authorizing the data consumer, attaching a view of the one or more data set context indexes and the one or more data sets associated with the given provisioned data set virtual neighborhood to an analytic sandbox associated with the data consumer.

23. The article of manufacture of claim 16 wherein the one or more software programs when executed further cause the processing device:
to authorize access by the data consumer to each of the interrelated data sets of the given data set virtual neighborhood; and
responsive to authorizing the data consumer, to attach a view of the one or more data set context indexes and the one or more data sets associated with the given provisioned data set virtual neighborhood to an analytic sandbox associated with the data consumer.

* * * * *